Figure 1:
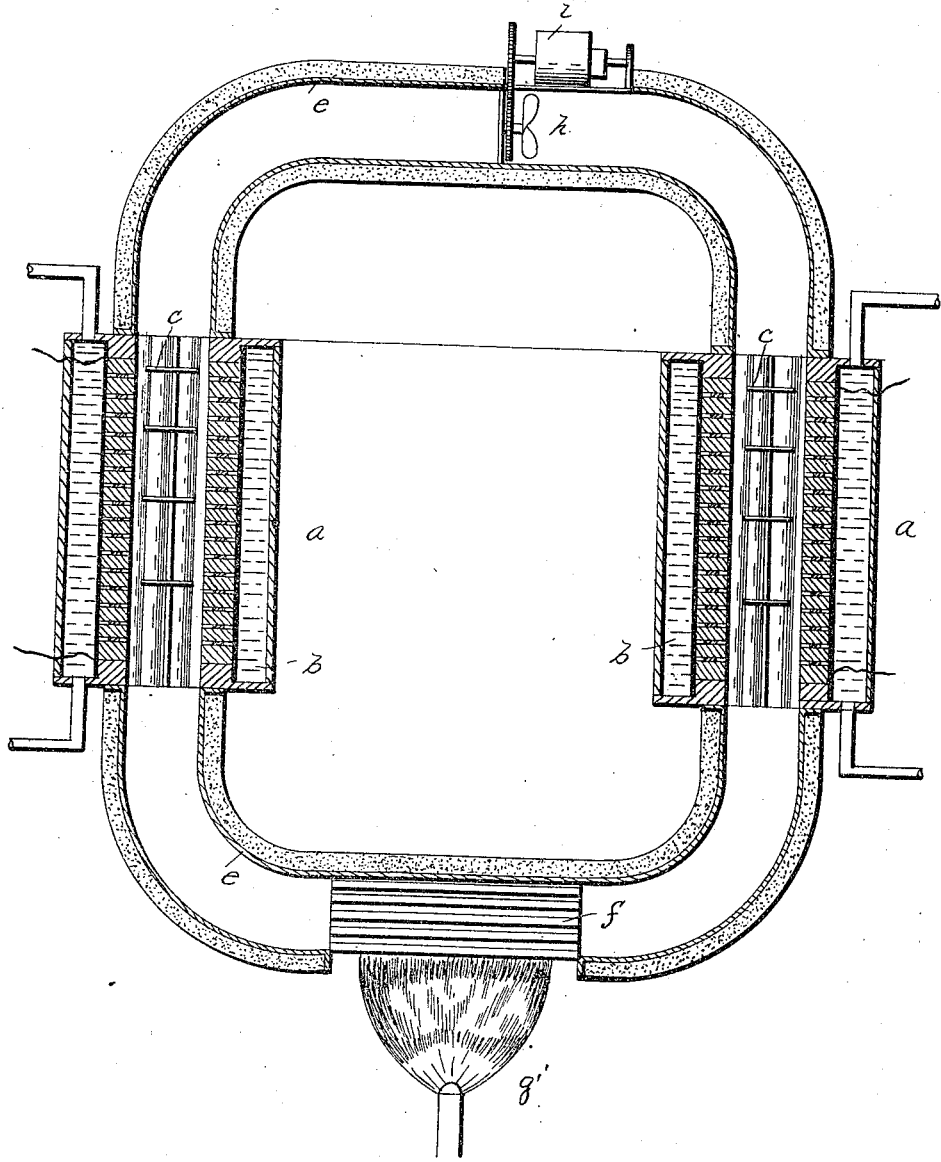

(No Model.) 2 Sheets—Sheet 1.

H. B. COX.
THERMO ELECTRIC GENERATOR.

No. 546,417. Patented Sept. 17, 1895.

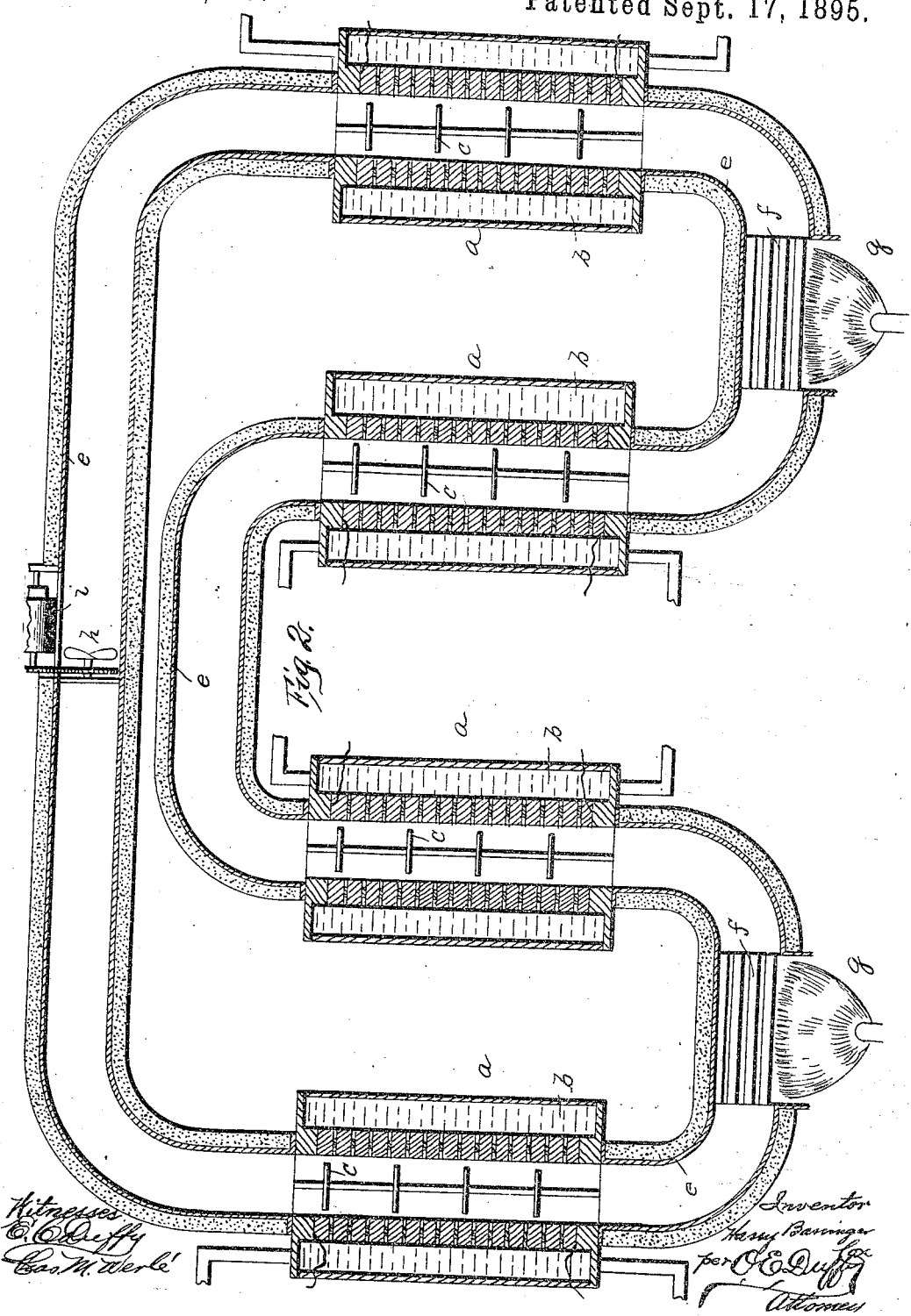

UNITED STATES PATENT OFFICE.

HARRY BARRINGER COX, OF HARTFORD, CONNECTICUT.

THERMO-ELECTRIC GENERATOR.

SPECIFICATION forming part of Letters Patent No. 546,417, dated September 17, 1895.

Application filed October 4, 1894. Serial No. 524,856. (No model.)

*To all whom it may concern:*

Be it known that I, HARRY BARRINGER COX, of Hartford, in the county of Hartford and State of Connecticut, have invented certain new and useful Improvements in Thermo-Electric Generators; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to certain improvements in means for operating thermo-electric generators.

A further object of the invention is to provide improved means for uniformly heating a surface of a thermo-electric generator by means of a heated moving fluid with the employment of simple and easily-controlled mechanism.

The invention consists in certain novel features of construction and in combinations of parts more fully and particularly described and set forth hereinafter.

Referring to the accompanying drawings, which illustrate a convenient means for carrying out my invention, Figure 1 is a sectional view illustrating my invention applied to two generators. Fig. 2 is a similar view showing the invention applied for several generators.

In the drawings, $a$ is a thermo-electric generator of any approved construction, preferably built up cylindrical in form, with a surrounding cooling-liquid jacket $b$, having suitable inlet and outlet openings for the cooling medium. The interior of the generator is usually coated with suitable refractory material, substantially as shown. If desired, a vertical series of deflectors $c$ can be supported within the generator to throw the heat laterally against the surface of the generator. These deflectors may be graduated in size, if needed.

In carrying out my improved method I employ a constantly-moving body of heated fluid as the medium for maintaining an even and uniform temperature at the inner surface of the generator by passing the fluid constantly through the interior of the generator and through a heating device and providing means for propelling the fluid and causing it to constantly circulate. A convenient means for carrying out this method can consist of a continuous conduit comprising the one or more (usually two or more) generators, a heating device, which is conveniently shown as a series of tubes above a gas-jet, and a propelling fan or pump within the conduit provided with exterior driving means. The conduit is filled with any conducting fluid, such as air.

In Fig. 1 two parallel generators are shown. Suitable means (not shown) can be provided to support them and the other devices shown.

$e$ is a metal or other material pipe formed in U-shaped sections. The upper section has its lower ends secured to the upper heads of the two generators and opening into and of about the same diameter as the interiors thereof.

The lower U-shaped section of the pipe has its ends secured to the lower heads of the generators and opens into the interiors of the generators and is of approximately the same diameter as the upper section of the pipe.

The lower section of the conduit comprises the heating device, consisting of the plurality of heating-tubes $f$, through which the fluid passes over the source of heat, such as a Bunsen burner $g$ or a coal or similar fire impinging its heat against these tubes.

$h$ is a rotary propelling-fan arranged in a suitable frame in the upper section of the conduit.

$i$ is a suitable electric motor suitably mounted on the exterior of the conduit and geared to the fan by gearing $j$.

It will thus be seen that by maintaining a comparatively rapid circulation of the air in the air circuit or conduit the heat from the heating device will be transferred to the generators and an approximately like and even temperature maintained throughout the entire fluid-circuit. Any suitable number of generators can be placed in this circuit and all parts thereof heated approximately to the same temperature by the heat conveyed by the air from the heater. The generators absorb the heat they require from the air, which is being constantly maintained at any desired (and easily controlled) temperature by the heating device, the air going constantly around and the heater constantly supplying all heat lost by absorption of the generators or through radiation.

In Fig. 2 the hot-air conduit is shown, including a plurality of generators.

The air-conduit is suitably insulated, so that all waste of heat and energy will be reduced to a minimum.

It is evident that various changes might be made in the forms, constructions, and arrangements of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. A thermo electric generator having its surface to be heated comprised within and forming a part of an insulated fluid circuit or conduit, means to heat the fluid in said conduit, and a propeller in said conduit for circulating the fluid therein, substantially as described.

2. A thermo electric generator, a continuous fluid conduit including the generator, a heater included in said conduit, and a propeller in said conduit provided with exterior driving means, substantially as set forth.

3. A thermo electric generator, in combination with a continuous closed insulated fluid conduit including the generator and a heater which form a part of the conduit, substantially as set forth.

4. One or more thermo electric generators, in combination with insulated pipes connecting the interiors thereof so as to form a continuous closed air conduit, a heater or heaters for the conduit, through which the air passes, and an air circulating device, substantially as described.

5. In a thermo electric generator, a continuous closed conduit of which a surface of the generator forms a part, and a propeller in said conduit, substantially as described.

6. A hollow thermo electric generator, a heater, a continuous insulated closed conduit of which said heater and the hollow interior of the generator form a part, substantially as described.

7. In a thermo electric generator, a continuous closed conduit of which a surface of the generator forms a part, a rotary propelling fan in the conduit, and a motor therefor at the exterior of the conduit, substantially as set forth.

8. In a thermo electric generator, a continuous closed conduit of which a surface of the generator forms a part and including a series of tubes provided with a heater, and propelling means in the conduit, substantially as set forth.

9. A pair of thermo electric generators having open centers, the top tube connecting the interiors of said generators and provided with fluid propelling means, and the bottom tube connecting the lower ends of said generators and provided with an air heating device, substantially as set forth.

In testimony that I claim the foregoing as my own I affix my signature in presence of two witnesses.

HARRY BARRINGER COX.

Witnesses:
 GEO. H. GILMAN,
 CHRIS. M. JOSLYN.